(12) United States Patent
Meissner et al.

(10) Patent No.: US 7,802,810 B2
(45) Date of Patent: Sep. 28, 2010

(54) AIRBAG MODULE FOR A MOTOR VEHICLE

(75) Inventors: Dirk Meissner, Berlin (DE); Christian Schreiber, Ahrensfelde (DE); Andreas Pradel, Berlin (DE); Kazuhiro Abe, Chennai (IN)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/453,116

(22) Filed: Apr. 29, 2009

(65) Prior Publication Data

US 2009/0212545 A1 Aug. 27, 2009

Related U.S. Application Data

(63) Continuation of application No. PCT/EP2007/061629, filed on Oct. 29, 2007.

(30) Foreign Application Priority Data

Nov. 2, 2006 (DE) .................. 10 2006 052 190

(51) Int. Cl.
*B60R 21/03* (2006.01)
*B60R 21/215* (2006.01)

(52) U.S. Cl. .................. 280/731; 280/728.3; 280/743.1

(58) Field of Classification Search .............. 280/728.3, 280/732, 743.2, 743.1, 731, 729
See application file for complete search history.

(56) References Cited

U.S. PATENT DOCUMENTS

| | | | |
|---|---|---|---|
| 3,837,669 A | 9/1974 | Nagazumi et al. | |
| 3,938,824 A | 2/1976 | Patzelt | |
| 3,945,665 A | 3/1976 | Tsutsumi et al. | |
| 4,772,045 A | 9/1988 | Kawaguchi et al. | |
| 5,439,248 A | 8/1995 | Steffens, Jr. et al. | |
| 5,887,892 A | 3/1999 | Burdack et al. | |
| 6,082,759 A | 7/2000 | Faigle et al. | |
| 6,494,483 B2 | 12/2002 | Floersheimer et al. | |
| 2002/0093181 A1* | 7/2002 | Dannenhauer et al. | 280/732 |
| 2004/0160039 A1 | 8/2004 | Heist et al. | |
| 2006/0157962 A1 | 7/2006 | Keutz et al. | |
| 2006/0157963 A1 | 7/2006 | Deckenhoff et al. | |

FOREIGN PATENT DOCUMENTS

| | | |
|---|---|---|
| DE | 2 256 720 A | 5/1974 |
| DE | 43 30 692 A1 | 3/1995 |
| DE | 296 06 322 U1 | 8/1996 |

(Continued)

*Primary Examiner*—Ruth Ilan
(74) *Attorney, Agent, or Firm*—Foley & Lardner LLP (57) ABSTRACT

An airbag module for a motor vehicle. The airbag module includes an airbag. The airbag includes an airbag sleeve enclosing an interior of the airbag. The airbag module further comprises a module receptacle on which the airbag is accommodated as an airbag package, a top surface, and a cover extending along the top surface. When the airbag module is installed, the top surface is arranged such that it faces the associated seat. At least one layer of the airbag forming a component of the airbag sleeve extends in front of the outer surface of the cover facing the seat. Components of the airbag module arranged in front of the outer surface of the cover, insofar as they are not located between the outer surface of the cover and the at least one airbag layer, remain connected to the airbag sleeve during inflation of the airbag.

26 Claims, 3 Drawing Sheets

FOREIGN PATENT DOCUMENTS

| | | |
|---|---|---|
| DE | 195 46 143 A1 | 6/1997 |
| DE | 196 48 136 A1 | 5/1998 |
| DE | 199 34 249 A1 | 2/2001 |
| DE | 100 20 929 A1 | 11/2001 |
| DE | 100 40 248 A1 | 3/2002 |
| DE | 101 23 207 C1 | 7/2002 |
| DE | 20 2005 000 818 U1 | 6/2005 |
| DE | 20 2005 000 924 U1 | 6/2005 |
| DE | 20 2005 008 937 U1 | 11/2005 |
| EP | 0 644 088 A2 | 3/1995 |
| EP | 0 844 143 B1 | 5/1998 |
| EP | 1 449 723 B1 | 11/2006 |
| GB | 2 405 121 B | 3/2007 |
| WO | WO 02/14117 A1 | 2/2002 |

* cited by examiner

AIRBAG MODULE FOR A MOTOR VEHICLE

CROSS-REFERENCE TO RELATED PATENT APPLICATIONS

This application is a Continuation of International Patent Application No. PCT/EP2007/061629, filed Oct. 29, 2007, which was published in German as WO/2008/052968 and is incorporated herein by reference in its entirety.

BACKGROUND

A vehicle may include one or more airbag modules to protect the occupants of the vehicle in a collision. Such an airbag module generally comprises an airbag inflated by a gas generator. The airbag may be formed as a sleeve (airbag sleeve) enclosing an interior (which may be filled with gas) of the airbag. The airbag module may further comprise a receptacle which accommodates the airbag package. A top surface of the airbag module may be arranged in the motor vehicle when the airbag module is installed, such that the top surface is associated with a seat of the motor vehicle. A cover of the airbag module may extend along the top surface, the cover comprising an outer surface facing the seat and an inner surface facing the interior of the module receptacle.

The term "seat" is understood not as a motor vehicle seat but that part of the motor vehicle interior which is taken up by a motor vehicle occupant, who is located according to requirements (on a specific seat) within the motor vehicle, and who is intended to be protected by the airbag module in the event of a crash.

Such an airbag module is, for example, known from DE 196 48 136 (incorporated by reference herein).

In a collision, the cover of such an airbag module may have to initially be opened before the airbag packed into the module receptacle may be deployed into the vehicle interior through the top surface of the airbag module closed by the cover. This generally occurs as the airbag expands when filled with gas by the associated gas generator. The expanding airbag presses against the cover, rupturing or tearing it along rupture joints or tear lines provided to open an aperture in the top surface of the airbag module. The airbag may be deployed through this aperture, which is oriented toward the vehicle occupant to be protected and/or the seat identified thereby, in the direction of the vehicle occupant to be protected and/or the corresponding seat.

In such arrangements, however, there is the problem that initially a considerable internal pressure has to be built up in the airbag before said airbag is able to move the cover from its closed position into an open position. This means that the airbag initially emerges from the module receptacle already with a correspondingly large internal pressure, leading to an increased risk of injury to a vehicle occupant leaning over the airbag module—outside his or her normal seating position—when additional measures might not have been taken to prevent injuries to the vehicle occupant in such an OOP-case ("out of position case"). Moreover, it is also possible that the cover, moving in the event of a crash under the pressure of the deployed airbag, causes an obstruction.

On the other hand, airbag modules are known which have no cover on the top surface facing the vehicle occupant to be protected, see DE 199 34 249 A1. In this case, however, there is the problem that no clear reproducible deployment of the airbag is ensured in the event of a crash and the combination with a horn function is difficult.

SUMMARY

One disclosed embodiment relates to an airbag module for a motor vehicle. The airbag module comprises an airbag that may be inflated by a gas generator for protecting a vehicle occupant located on a seat of a motor vehicle. The airbag includes an airbag sleeve enclosing an interior of the airbag. The airbag module further comprises a module receptacle on which the airbag is accommodated as an airbag package, a top surface, and a cover extending along the top surface. When the airbag module is installed according to requirements in a motor vehicle, the top surface is arranged such that it faces the associated seat. At least one layer of the airbag forming a component of the airbag sleeve extends in front of the outer surface of the cover facing the seat. Components of the airbag module arranged in front of the outer surface of the cover, insofar as they are not located between the outer surface of the cover and the at least one airbag layer, remain connected to the airbag sleeve during inflation of the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

One disclosed embodiment relates to an airbag module for a motor vehicle. The airbag module comprises an airbag that may be inflated by a gas generator for protecting a vehicle occupant located on a seat of a motor vehicle. The airbag includes an airbag sleeve enclosing an interior of the airbag. The airbag module further comprises a module receptacle on which the airbag is accommodated as an airbag package, a top surface, and a cover extending along the top surface. When the airbag module is installed according to requirements in a motor vehicle, the top surface is arranged such that it faces the associated seat. At least one layer of the airbag forming a component of the airbag sleeve extends in front of the outer surface of the cover facing the seat. Components of the airbag module arranged in front of the outer surface of the cover, insofar as they are not located between the outer surface of the cover and the at least one airbag layer, remain connected to the airbag sleeve during inflation of the airbag.

Accordingly, it is provided that at least one layer (forming a component of the airbag sleeve) of the airbag arranged in the airbag module extends in front of the outer surface of the cover facing the seat. The components of the airbag module located in front of the outer surface of the cover, insofar as they are not located between the cover and the airbag layer, remain connected to the airbag sleeve (permanently) during inflation of the airbag. The airbag layer is not covered by any further components of the airbag module that do not form a component of the airbag.

The airbag module does not include an airbag cap or another member covering said airbag layer that would have to be opened first before the airbag layer could be moved in the direction of a vehicle occupant to be protected. One or more components may form a constituent part of the airbag and, during inflation and deployment of the airbag, may move together with said airbag. According to an exemplary embodiment, such components are a design layer (e.g., formed from foamed material or soft leather) provided over said airbag layer.

Further functional components, such as an adhesive coupling the airbag layer to the cover, may be located between the airbag layer and the outer surface of the cover of the airbag module. During inflation of the airbag, these functional components may not remain (entirely) connected to the airbag layer and/or the cover.

Because the airbag module lacks a cap covering the airbag layer, the airbag may be inflated in a collision directly toward the vehicle occupant to be protected without having to build up a large internal pressure to open the airbag cap. As the airbag layer extends over an outer surface of the cover of the airbag module, said airbag layer is always located—before inflation—in a clear and reproducible position within the motor vehicle. The cover of the airbag module acts as a support surface from which the airbag layer may move in a defined manner toward the associated seat and/or the vehicle occupant to be protected when the airbag is filled with gas. The arrangement allows the airbag layer to move in a clear and reproducible manner in the direction of the vehicle occupant to be protected during deployment of the airbag in a collision.

If the airbag module is a driver airbag module, providing the cover of the airbag module behind at least one airbag layer simplifies the triggering of a warning device such as a hooter and/or a horn. The forces required to trigger the warning device may be applied to the cover. An electrical contact region on the module side may be brought into contact with a contact region on the steering wheel side to trigger the warning device. According to one exemplary embodiment, the electrical contact region may be a contact film provided on the cover of the airbag module. According to other exemplary embodiments, the contact region may be arranged on a different component of the airbag module, such as for example the module receptacle.

The cover is preferably arranged inside the airbag (folded up and/or gathered up to form a package). According to one embodiment, no component beside the at least one airbag layer is located in front of the outer surface of the cover. The airbag layer may be a component of the airbag sleeve and accordingly is adjacent to the interior of the airbag enclosed by the airbag sleeve.

According to another exemplary embodiment, at least one further material layer may be connected to the airbag layer arranged in front of the outer surface of the cover. This further material may remain connected to the airbag sleeve during inflation of the airbag. The further material layer forms a component of the sleeve of the airbag and thus continually remains connected to each airbag layer moves during inflation of the airbag together with the airbag layer located initially in front of the cover. The additional material layer may be configured to modify the surface properties of the airbag sleeve (e.g., the design, the vibrational response, or the impact properties).

According to an exemplary embodiment, the further material layer may be a material layer separate from the aforementioned airbag layer and be connected to the airbag layer by a suitable fastener, such as an adhesive. The material layer may be, for example, leather (e.g., a soft leather), a woven fabric, a plastic and/or metal layer (e.g., a deep-drawn or stamped sheet), or a foamed material layer.

According to another exemplary embodiment, the additional material layer may be applied as a material layer chemically or physically directly onto the aforementioned airbag layer. Such an additional material layer may, for example, be a color coating, a foamed material layer foamed onto the airbag layer, a metal or rubber coating, a printed layer or so-called slush skin.

The additional material layer and/or material coating may additionally provide further functions within the motor vehicle. For example, a printed electroluminescent film may produce illuminated effects; an electronic contact film may detect and/or produce signals; or a shrink film may protect and retain parts of the airbag module.

While it may be provided in front of the airbag layer, the further material layer does not form a cover of the airbag module that must be initially opened and/or destroyed during inflation of the airbag to allow a deployment of the airbag out of the module receptacle. Instead the additional material layer is a component of the airbag and is permanently connected to the airbag sleeve and/or specifically to the at least one airbag layer initially arranged in front of the cover of the airbag module.

The previously described embodiments describe an airbag module with just one airbag layer arranged in front of the outer surface of the cover of the airbag module, with the one airbag layer being able to be partially folded. However, according to other exemplary embodiments, a plurality of airbag layers (located on top of one another) may be provided in front of the outer surface of the cover of the airbag module.

The at least one airbag layer may be releasably fixed to the cover of the airbag module so that it may be easily released therefrom during inflation of the airbag. The airbag layer may be coupled to the cover with, for example, a suitable adhesive.

The cover is preferably connected to the module receptacle, in which components of the airbag modules such as the airbag folded together to form a package and a gas generator may be are arranged. At least one connection region may be provided extending from said cover to a base of the module receptacle. The connection region or parts thereof may be formed integrally on the cover and/or on the module receptacle. Moreover, the cover may be connected to the module receptacle via a connection region with fasteners (e.g., latching elements, clips, screws, etc.).

The cover is preferably arranged on the airbag module such that it is not released from the airbag module during inflation of the airbag (e.g., the cover remains permanently connected to the module receptacle, without moving substantially in the direction of the vehicle occupant to be protected). Many conventional airbag modules include a cap that are folded down, in which one side of the cap is permanently connected via a hinge to the airbag module and the remaining regions of the cap, when inflating the airbag move in the direction of the vehicle interior. However, according to an exemplary embodiment, the cover, even in partial regions, is intended not to be released from the airbag module and is intended not to move in the direction of the vehicle occupant to be protected.

Accordingly, the pressure produced during inflation of the airbag may only cause the cover to bulge.

Whilst at least one layer of the airbag is arranged in front of the outer surface of the cover, the regions of the airbag packed together to form an airbag package are preferably located behind the other internal surface of the cover, in the receptacle of the airbag module. The cover may enclose the module interior together with the module receptacle on all sides. The regions of the airbag packed together to form an airbag package are preferably arranged at the side, such that the gas generator and the airbag package are located adjacent to one another along the surface along which the top surface and/or cover of the airbag module extends. In this embodiment, in particular, it may be provided that the airbag package surrounds the gas generator in an annular manner.

The discharge apertures of the gas generator, through which gas produced by the gas generator flows preferably face at least partially toward the regions of the airbag packed together to form a package. The gases emerging from the discharge apertures of the gas generators flow in directions along the top surface of the airbag module (i.e., substantially parallel to the top surface of the airbag module).

The connection region connecting the cover of the airbag module to the receptacle thereof may surround the gas generator. The regions of the airbag packed together to form an airbag package may then be provided outside the space enclosed by the connection region. Through-openings may be provided in the connection region, through which gas emerging from the gas generator may flow into the airbag. According to one exemplary embodiment, the through-openings may have a uniform distribution and/or size along the extension of the connection region around the gas generator. According to other exemplary embodiments, the through-openings may be arranged at different spacings and/or have different dimensions to controlling the deployment of the airbag.

According to other exemplary embodiments, the cover of the airbag module may be connected to the airbag receptacle via a plurality of separate connecting portions spaced apart from one another, so that gas emerging from the gas generator may flow through the free space formed respectively between two connecting portions into the airbag, in order to inflate said airbag.

According to one exemplary embodiment, at least one side wall of the airbag module extends substantially transversely to the top surface at least partially covered by the cover of the airbag module. The side wall may be opened so that the airbag may be deployed through the aperture opened up when opening the side wall and namely preferably along the top surface of the airbag module (i.e., substantially parallel to the top surface). Therefore, the side wall may be advantageously articulated so that it may pivot (e.g., via a hinge) on the airbag module and/or more precisely on the module receptacle. According to another exemplary embodiment, the side wall may be configured to be destructible, for example tearable, during inflation of the airbag.

In such an airbag module, the deploying airbag initially emerges from the airbag module in a direction extending substantially parallel to the top surface of the airbag module. Thus the airbag does not deploy towards the vehicle passenger (e.g., a passenger towards which the top surface of the airbag faces), but in a lateral direction to reduce the risk of injury for the vehicle occupant. Only after the initial lateral deployment does the airbag layer arranged in front of the cover of the airbag module begin to lift away from the cover and—at relatively low speed—to move in the direction of the vehicle occupant to be protected. As a result, the risk of injury to a vehicle occupant located outside his or her normal position (e.g., close to the airbag module) is minimized during inflation and deployment of the airbag. The discharge apertures of the gas generator preferably face in the direction of the side walls of the airbag module to deploy or inflate the airbag initially in a lateral direction.

Figure 1:
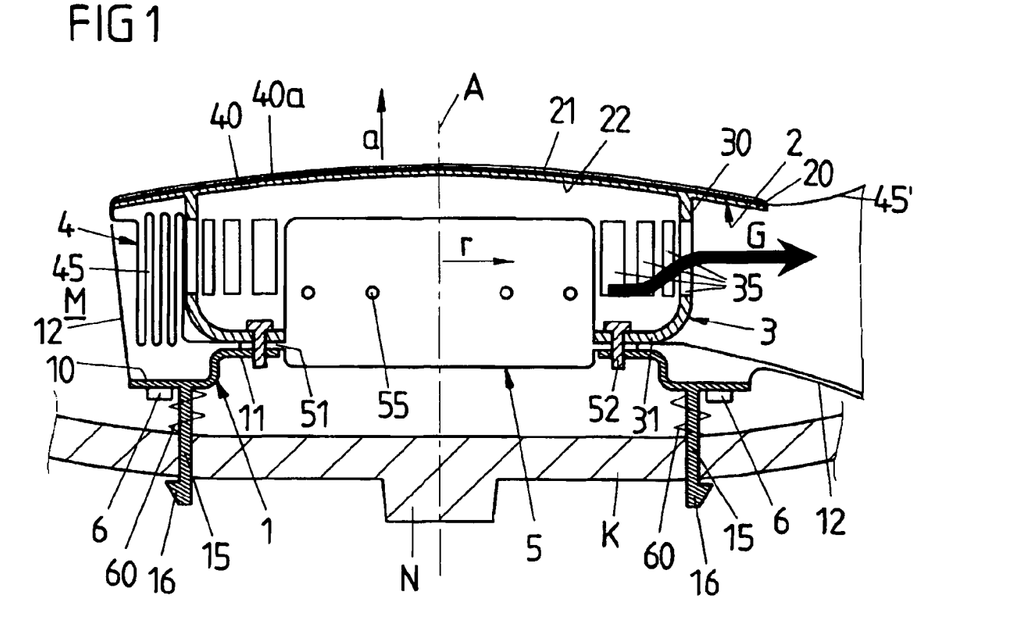
FIG. 1 is a cross-section view of an airbag module arranged on a steering wheel for a motor vehicle according to an exemplary embodiment.
Figure 1A:
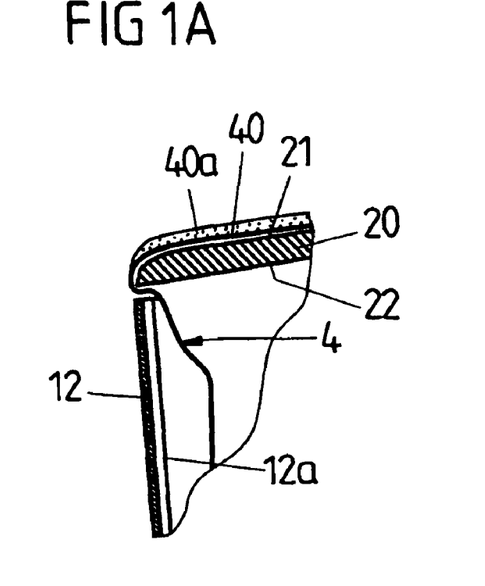
FIG. 1A shows a detail of the view of FIG. 1.
Figure 1B:
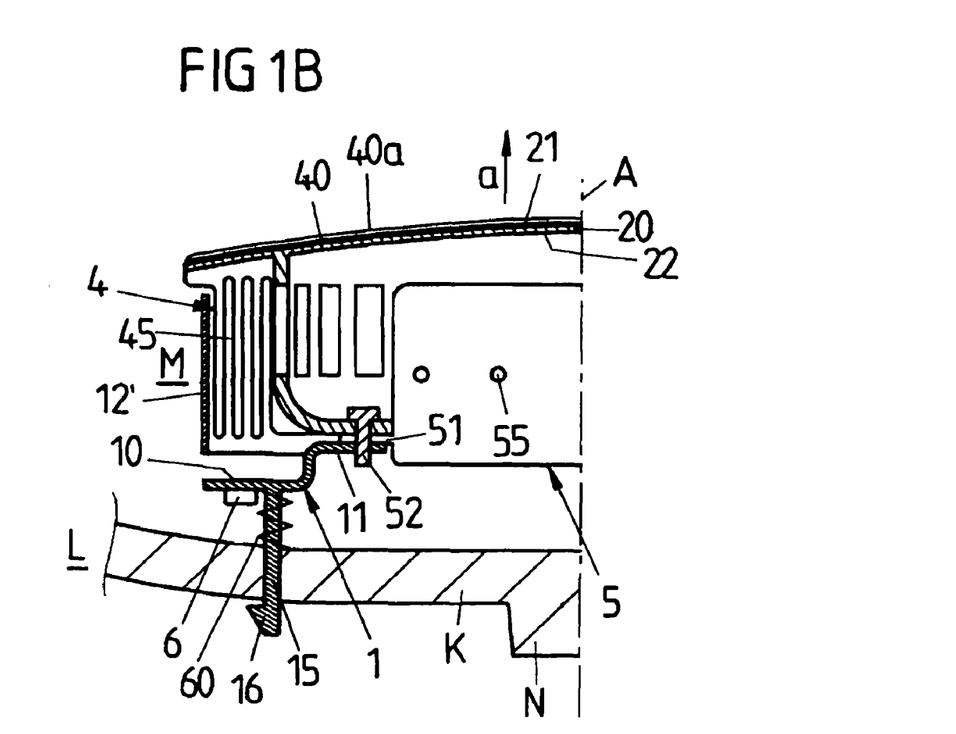
FIG. 1B shows a detail of FIG. 1 with a variant regarding the design of a side wall of the airbag module.
Figure 2:
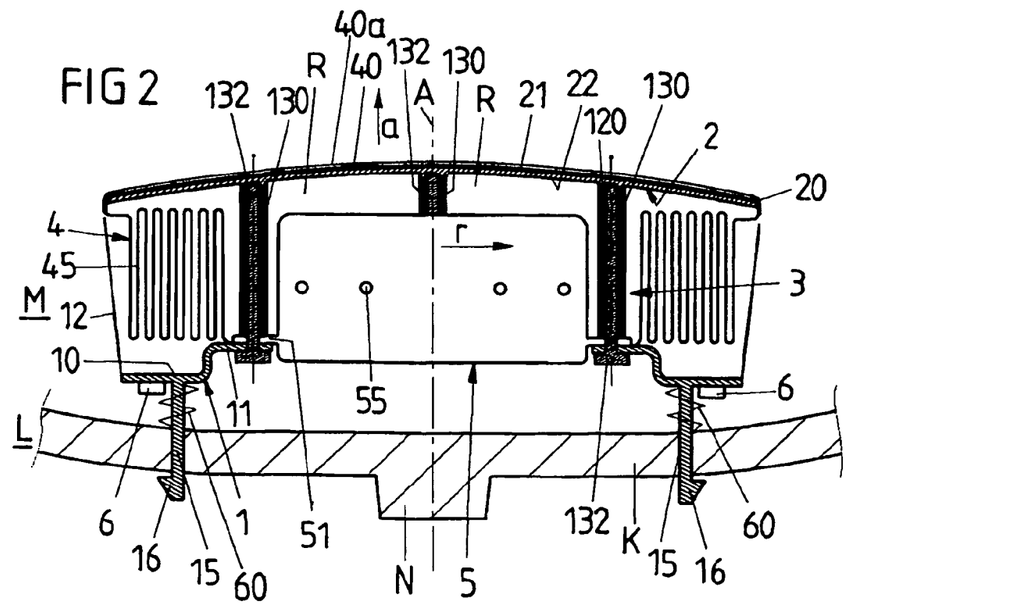
FIG. 2 is a cross-section view of an airbag module according to another exemplary embodiment.
Figure 3:
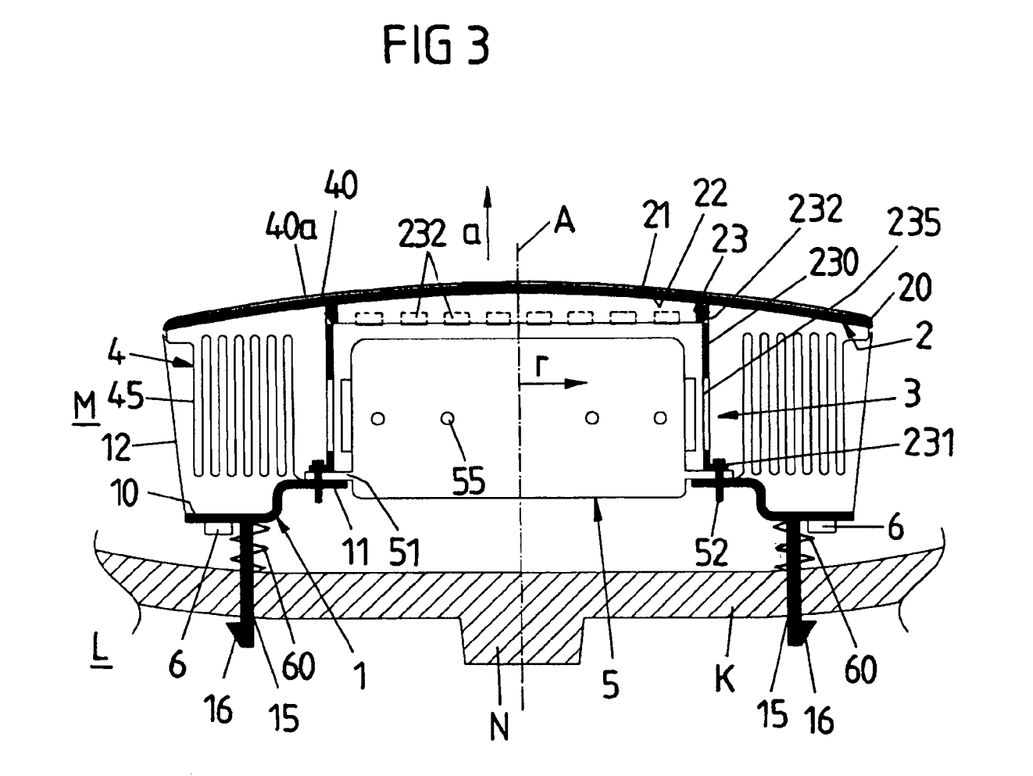
FIG. 3 is a cross-section view of an airbag module according to another exemplary embodiment.

Referring now to FIGS. 1-3, an airbag module is shown according to several exemplary embodiments.

FIG. 1 shows an airbag module M for a motor vehicle that is coupled to a steering wheel hub N on the steering wheel body K of a steering wheel L. The airbag module M comprises a module receptacle 1, an airbag 4 which may be inflated to protect a vehicle occupant, and a gas generator 5 for inflating the airbag 4 in a collision. According to one exemplary embodiment, one or more components of the airbag module M are formed from a polymer material.

FIG. 1 is a cross-section view of the airbag module M, with the left-hand half of FIG. 1 (left of the central axis A) showing the airbag module M in the resting state and the right-hand half of FIG. 1 (right of the central axis A) showing the airbag module M during inflation of the airbag 4 by the gas generator 5.

The module receptacle 1 comprises a module base 10 and an annular peripheral side wall 12 projecting from the module base 10 which surrounds the airbag 4 as well as the gas generator 5 in an annular manner. Fastening hooks 15 project from the module base 10 in the direction of the steering wheel body K with the free ends of the fastening hooks 15 including a fastening head 16. The steering wheel body K is provided in the surroundings of the steering wheel hub N with corresponding latching openings that receive the fastening hooks 15. The fastening hooks 15 engage the latching openings to fasten the airbag module M to the steering wheel body K with a latching connection.

The module receptacle 1 forms on the module base 10 a fastening flange 11 surrounding a gas generator 5. According to an exemplary embodiment, the gas generator 5 is a pot-shaped gas generator and the fastening flange 11 surrounds the gas generator 5 in an annular manner. The fastening flange 11 bears against an associated fastening flange on the generator side (generator flange 51), so that the gas generator 5 may be secured by suitable fasteners 52, for example in the form of screws, to the module receptacle 1.

The module base 10 of the module receptacle 1 includes electrical contact elements 6 remote from the module interior (e.g., facing the steering wheel body K). The electrical contact elements 6 may be brought into electrical contact for triggering an electrical functional component of the motor vehicle. For example, a warning device (e.g., a horn, etc.) with corresponding counter contacts on the steering wheel side may sound if a force is exerted onto the airbag module M in the direction of the steering wheel body K. The airbag module M may be elastically supported via spring elements 60, shown as helical springs helical compression springs, provided on the fastening hooks 15. These spring elements 60 hold the airbag module M during normal operation at such a distance from the steering wheel body K that the contact elements 6 on the module side are not in contact with the associated counter contacts on the steering wheel side.

A user of the steering wheel (driver of a motor vehicle) may press with his or her palm on a cover 2 of the airbag module M to exert a force on the airbag module M in the direction of the steering wheel body K and compress the spring elements 60 so that the contact elements 6 on the module side may come into electrical contact with the counter contacts on the steering wheel side to sound the warning device.

The side wall 12 of the module receptacle 1 projects from the module base 10 and surrounds in an annular manner the airbag arranged in the module interior as well as the gas generator 5. The side wall 12 may be formed of such a material and/or of such thin-walled configuration that the side wall 12 may be destroyed and/or may be opened under the action of the deploying airbag 4 to allow the airbag 4 during to emerge laterally through the side wall 12.

The airbag 4 may be arranged or folded up to form an airbag package 45 located to the side, adjacent to the gas generator 5. The regions of the airbag 4 folded up to form an airbag package 45 are neither located between the gas generator 5 and the steering wheel body K nor between the gas generator 5 and the module cover 2, but adjacent to the gas generator 5 between the module base 10 and the module cover 2.

The discharge apertures 55 are provided on the gas generator 5 through which gas generated by the gas generator in a collision may emerge from the gas generator 5 to inflate the airbag 4. The discharge apertures 44 are oriented laterally in the direction of the airbag package 45 located adjacent to the gas generator 5. The gas flow G emerging through the discharge apertures 55 from the gas generator 5 is substantially oriented along the module base 10 and/or the module cover 2. The gas flow G extends substantially parallel both to the module base 10 and to the module cover 2 and between the module base 10 and the module cover 2.

The module cover 2 is coupled to the module receptacle 1 via a connection region 3 that extends from the module cover 2 in the direction of the module base 10. According to an exemplary embodiment, the connection region comprises a bent-back end portion 31 that extends substantially parallel to the fastening flanges 11, 51 of the module receptacle 1 and of the gas generator 5. The bent-back end portion 31 may be secured via the fasteners 52 to the gas generator 5 and the module base 10.

The connection region 3 further comprises an annular wall 30 projecting from the module cover 2 and formed integrally thereon. The annular wall 30 surrounds the gas generator 5 and is located between the gas generator 5 and the airbag package 45. The connection region 3 therefore extends between the gas generator 5 and the airbag package 45. Through-openings 35 are formed in the connection region 3, which allow a gas flow G in the radial direction from the gas generator 5 to the airbag package 45 for inflating the airbag 4.

The module cover 2 the airbag module M shown in FIG. 1 is formed by a covering cap 20 fixed to the module receptacle 1 via the connection region 3. The module cover 2 has an inner surface 22 facing the module interior (e.g., the airbag package 45 as well as the gas generator 5) and an outer surface 21 facing the exterior surrounding the airbag module M. When the steering wheel L installed in a motor vehicle, the outer surface 21 of the airbag module M faces in the direction of the seat of a vehicle driver and/or driver. The outer surface 21 thus faces the driver of the motor vehicle when said driver is located on his or her seat behind the steering wheel L.

The covering cap 20 is formed from a sufficiently rigid material (e.g., plastics) and has no weakened regions in the form of tear lines or the like. Therefore, during inflation and deployment of the airbag 4, the module cover 2 is not opened (i.e., does not open up an aperture in the upper top surface of the airbag module M). As shown on the right-hand side of FIG. 1, the airbag 4 is deployed, instead, initially only in the lateral and/or radial direction r (i.e., along the module base 10 and the module cover 2) outwardly through the side wall 12 of the module receptacle 1 torn open during deployment of the airbag 4.

The airbag regions 45', previously folded up to form airbag package 45, emerge to the side, out of the module interior by bursting through the frangible side wall 12 of the module receptacle 1. Preferably, the side wall 12 is configured such that it is divided or broken into individual segments by the deploying airbag 4. As shown best in FIG. 1A, the division takes place advantageously along tear lines 12a configured on the side wall 12, for example in the form of perforations or other material weakened portions. Alternatively, the side wall 12 may be subdivided into a plurality of unconnected individual segments that surround the airbag 4 and the gas generator 5, for example in the form of individual fingers or panels. The right-hand side of FIG. 1 shows a segment of the side wall 12 separated from the remaining regions of the side wall during deployment of the airbag 4 along the tear lines. The force of the deployed airbag 4 folds the segment of the side wall 12 down around a hinge region coupling the side wall to the module base.

A layer 40 of the airbag 4 extends in front of the surface 21 of the module cover 2. As shown best in FIG. 1A, the layer 40 is guided through an annular gap between the side wall 12 and the module cover 2 of the airbag module M from the module interior in front of the outer surface 21 of the module cover 2. This airbag layer 40 thus faces the seat of the vehicle occupant to be protected.

The airbag layer 40 located in front of the outer surface 21 of the module cover 2 is releasably fixed to the module cover 2, for example by an adhesive applied between the airbag layer 40 and the outer surface 21 of the module cover 2, so that the airbag layer 4 may be released from the module cover 2 (e.g., the outer surface 21 of the module cover 2), when comparatively large (tractive) forces act on the airbag 4 during inflation and deployment of the airbag 4 to lift the airbag layer 40 away from the module cover 2.

Once separated from the cover 2, the airbag layer 40 then moves in the axial direction a (along the central module axis A and substantially perpendicular to the outer surface 21 of the module cover 2) in the direction of the vehicle occupant to be protected.

Because the module cover 2 is located permanently between the airbag layer 40 and the module interior, in particular the gas generator 5, gases emerging from the gas generator 5 does not flow directly over the airbag layer 40. The gas flow G emerges instead, as described above, in the lateral and/or radial direction r from the gas generator 5 and primarily causes a lateral deployment of the airbag 4 through the side wall 12 of the airbag module M. The airbag 4 is not immediately deployed during inflation, therefore, in the direction of the vehicle occupant to be protected, but initially in the radial direction r, laterally in front of the vehicle occupant to be protected.

As a result of the expansion of the airbag 4 during inflation, forces increasingly act on the airbag sleeve which have the tendency to lift the airbag layer 40 away from the airbag cover 2 (e.g., the outer surface 21 of the airbag cover 2). The airbag layer 40 thus moves at a correspondingly reduced speed in the axial direction a perpendicular to the module cover 2 and/or the outer surface 21 thereof in the direction of the vehicle occupant to be protected. As a result, the risk of injury to the vehicle occupant by coming into contact with the deployed airbag 4 is reduced, in particular in such cases in which the vehicle occupant at the time of the inflation and deployment of the airbag 4 is located outside his or her normal seating position, exceptionally close to the airbag module M, for example because the vehicle occupant has leaned over the steering wheel L or is not wearing a safety belt.

Referring especially to FIG. 1A, an additional material layer 40a may be applied to the airbag layer 40 on the side of the airbag layer 40 remote from the cover 2 and facing the vehicle occupant to be protected. The additional material layer 40a may be provided for a variety of purposes including, but not limited to, aesthetic reasons, improved the haptics or force feedback, or even to optimize the airbag layer 40 with regard to its properties when coming into contact with a vehicle occupant to be protected.

This additional material layer 40a is not a cover of the airbag layer 40 that is opened during deployment of the airbag to allow a movement of the airbag layer 40 in the direction of the vehicle occupant to be protected. Instead, this material layer 40a is permanently connected to the airbag layer 40; and remains coupled to the airbag layer 40 even during inflation and deployment of the airbag 4 and when the airbag layer 40 comes into contact with a vehicle occupant to be protected.

According to various exemplary embodiments, the additional material layer 40a may be a relatively soft leather, a woven fabric, a plastic or metal layer (i.e., a deep-drawn or stamped sheet), or a foamed material layer. The additional material layer 40a may be coupled to the airbag layer 40, for example, by bonding or welding. The material layer 40a may also be directly applied chemically or physically to the airbag layer 40, for example, as a color coating, as a foamed plastic, as a "slush skin", as a metal or rubber coating, or as a printed layer.

According to still other exemplary embodiments, the additional material layer 40a may comprise an electroluminescent film for producing illuminated effects, may comprise a shrink film for protecting and retaining the airbag layer 40, or may comprise a sensor film and/or contact film for triggering a horn.

Referring now to FIG. 1B, a side wall 12' of the module receptacle 1 is shown according to another exemplary embodiment. The side wall 12' is a separate component from the module base 10 of the module receptacle 1, surrounding the airbag 4 and the gas generator 5 in an annular manner. The side wall 12' is secured in a suitable manner to the airbag module, in particular to the module receptacle 1 (and/or to the module base 10). The side wall 12' may be formed of a rigid or flexible material. When the airbag 4 is deployed after activating the gas generator 5 it opens an aperture for the deployed airbag, for example by tearing open or folding down the side wall 12'.

Referring now to FIG. 2, a modification of the embodiment of FIG. 1 is shown. The embodiment shown in FIG. 2 differs from the arrangement shown in FIG. 1 in the design of the connection region 3, via which the module cover 2 is connected to the module receptacle 1. According to the arrangement described above, shown in FIG. 1, the connection region 3 is formed integrally on the module cover 2, projecting therefrom in the direction of the base 10 of the module receptacle 1 and enclosing the gas generator 5 in an annular manner. The connection region 3 is secured to the module receptacle 1 via fasteners 52.

Accordingly, in the arrangement shown in FIG. 2, the connection region 3 is formed by a plurality of connecting portions projecting from the module cover 2 spaced apart from one another. In their entirety, the connecting portions surround the gas generator 5 in an annular manner. The connecting portions respectively consist of a connecting sleeve such as a spacer bush 130 extending from the module cover 2 to the module base 10 and/or the fastening flange 51 of the gas generator 5. A threaded portion 120 is formed integrally in each spacer bush 130 that is configured to receive a fastener such as a screw 132. The respective fastening screw 132 penetrates respectively a through hole in the fastening flange 11 of the module receptacle 1, a through hole in the generator flange 51 of the gas generator 5, and a spacer bush 130. The fastening screws 132 is screwed into the threaded portion 120 to secure both the module cover 2 and the gas generator 5 to the module receptacle 1.

The spacer bushes 130 extend respectively from the module cover 2 to the base 10 of the module receptacle 1 and bear at that point respectively against the generator flange 51. As the individual spacer bushes 130 are spaced apart from one another, the gas emerging from the discharge apertures 5 of the gas generator 5 may flow through the intermediate spaces R located between the individual connecting portions 130 into the airbag to be inflated and/or more precisely into the airbag package 45.

Moreover, the embodiment shown in FIG. 2 coincides with the arrangement of FIG. 1.

FIG. 3 shows a further modification of the arrangement of FIG. 1 with regard to the design of the connection region 3, via which the module cover 2 is connected to the module receptacle 1, more precisely the module base 10. As shown in FIG. 3, according to another exemplary embodiment, a connecting ring 230 may enclose the gas generator 5 in an annular manner. The connecting ring 230 is secured as a separate part to the module cover 2 and to the module receptacle 1 in the region of the module base 10. The connecting ring extends from the module cover 2 to the module base 10 (e.g., proximate to the generator flange 51).

The connecting ring 230 is secured to the module cover 2 by a latching connection with latching hooks 23 on the module cover side engaging latching openings 232 on the connecting ring side. The connecting ring 230 is coupled to the module receptacle 1 with fasteners 52 such as screws which, as already described with reference to FIG. 1, also secure the gas generator 5 to the module receptacle 1. The fastening screws 52 penetrate fastening openings aligned with one another in a bent-back flange portion 231 of the connecting ring 230, in the generator flange 51 as well as in the fastening flange 11 of the module receptacle 1.

The fastening ring 230 forming the connection region 3 includes a plurality of through-openings 235 through which gas emerging from the discharge apertures 55 of the gas generator 5 may flow into the airbag package 45.

The priority application, German Patent Application No. 10 2006 052 190.0, filed Nov. 2, 2006 including the specification, drawings, claims and abstract, is incorporated herein by reference in its entirety.

What is claimed is:

1. An airbag module for a motor vehicle, comprising:
   an airbag that may be inflated by a gas generator for protecting a vehicle occupant located on a seat of a motor vehicle, the airbag comprising an airbag sleeve enclosing an interior of the airbag;
   a module receptacle on which the airbag is accommodated as an airbag package;
   a top surface of the airbag module, that is arranged in the motor vehicle when the airbag module is installed according to requirements in a motor vehicle, such that the top surface faces the associated seat; and
   a cover of the airbag module, an outer surface of the cover facing toward the seat,
   wherein at least one airbag layer forming a component of the airbag sleeve extends in front of the outer surface of the cover facing the seat,
   wherein the at least one airbag layer remains connected to the airbag sleeve during inflation of the airbag,
   wherein the airbag moves in the direction of a vehicle occupant to be protected, the occupant sitting on the associated seat, wherein all airbag sleeve components that are located in front of the outer surface of the cover and that are moved so that the airbag may be inflated in the direction of the vehicle occupant to be protected remain connected during inflation of the airbag to the airbag sleeve, and wherein at least one further flexible material layer is arranged in front of the outer surface of the cover additionally to the at least one airbag layer, the further flexible material layer being connected to the at least one airbag layer in front of the outer surface of the cover and remains connected to the at least one airbag layer during inflation of the airbag.

2. The airbag module as claimed in claim 1, wherein the further material layer is connected to the at least one airbag layer and during inflation of the airbag permanently rests flat against said airbag.

3. The airbag module as claimed in claim 1, wherein the further material layer is connected to the at least one airbag layer such that the further material layer moves during inflation of the airbag together with the at least one airbag layer.

4. The airbag module as claimed in claim 1, wherein the further material layer is configured as a material layer separate from the airbag layer that is connected to the airbag sleeve.

5. The airbag module as claimed in claim 1, wherein the further material layer is applied chemically or physically to the airbag layer.

6. An airbag module for a motor vehicle, comprising:
an airbag that may be inflated by a gas generator for protecting a vehicle occupant located on a seat of a motor vehicle, the airbag comprising an airbag sleeve enclosing an interior of the airbag;
a module receptacle on which the airbag is accommodated as an airbag package;
a top surface of the airbag module, that is arranged in the motor vehicle when the airbag module is installed according to requirements in a motor vehicle, such that the top surface faces the associated seat; and
a cover of the airbag module, an outer surface of the cover facing toward the seat,
wherein at least one airbag layer forming a component of the airbag sleeve extends in front of the outer surface of the cover facing the seat,
wherein the at least one airbag layer remains connected to the airbag sleeve during inflation of the airbag,
wherein the airbag moves in the direction of a vehicle occupant to be protected, the occupant sitting on the associated seat,
wherein all airbag sleeve components that are located in front of the outer surface of the cover and that are moved so that the airbag may be inflated in the direction of the vehicle occupant to be protected remain connected during inflation of the airbag to the airbag sleeve,
wherein at least one further flexible material layer is arranged in front of the outer surface of the cover additionally to the at least one airbag layer, the further flexible material layer being connected to the airbag sleeve and remaining connected to the airbag sleeve during inflation of the airbag, and
wherein the further material layer is arranged in front of an outer surface of the at least one airbag layer that is remote from the cover.

7. The airbag module as claimed in claim 6, wherein the cover comprises a substantially dimensionally stable material.

8. The airbag module as claimed in claim 6, wherein the cover is arranged inside the airbag.

9. The airbag module as claimed in claim 6, wherein the at least one airbag layer is releasably fixed to the cover.

10. The airbag module as claimed in claim 9, wherein the cover remains connected to the module receptacle during inflation of the airbag.

11. The airbag module as claimed in claim 6, wherein no components of the airbag module that may be opened during inflation of the airbag, in order to allow a movement of the at least one airbag layer in the direction of the seat are located in front of the surface of the airbag layer.

12. The airbag module as claimed in claim 6, wherein the cover is connected to the module receptacle via at least one connection region that extends from the cover to a base of the module receptacle.

13. The airbag module as claimed in claim 12, wherein the cover and the module receptacle are connected to one another via the connection region by mechanical connectors.

14. The airbag module as claimed in claim 13, wherein the mechanical connectors are latching elements.

15. The airbag module as claimed in claim 12, wherein the connection region surrounds the gas generator and in that the regions of the airbag packed together to form the airbag package are arranged outside a space enclosed by the connection region.

16. The airbag module as claimed in claim 15, wherein through-openings are provided in the connection region through which gas may flow out of the gas generator into the regions of the airbag packed together to form the airbag package.

17. An airbag module for a motor vehicle, comprising:
an airbag that may be inflated by a gas generator for protecting a vehicle occupant located on a seat of a motor vehicle, the airbag comprising an airbag sleeve enclosing an interior of the airbag;
a module receptacle on which the airbag is accommodated as an airbag package;
a top surface of the airbag module, that is arranged in the motor vehicle when the airbag module is installed according to requirements in a motor vehicle, such that the top surface faces the associated seat; and
a cover of the airbag module, an outer surface of the cover facing toward the seat,
wherein at least one airbag layer forming a component of the airbag sleeve extends in front of the outer surface of the cover facing the seat,
wherein the at least one airbag layer remains connected to the airbag sleeve during inflation of the airbag,
wherein at least one airbag region of the airbag packed together to form the airbag package is located behind an inner surface of the cover remote from the seat, and
wherein at least one airbag region of the airbag packed together to form the airbag package is located behind the cover, the airbag region only being deployed past the cover during inflation of the airbag if the cover is not open or destroyed.

18. The airbag module as claimed in claim 17, wherein the cover bulges during inflation of the airbag.

19. The airbag module as claimed in claim 17, wherein the cover together with the module receptacle encloses a module interior.

20. The airbag module as claimed in claim 17, wherein at least one airbag region of the airbag packed together to form the airbag package is arranged in the module interior.

21. The airbag module as claimed in claim 17, wherein the airbag package surrounds the gas generator in an annular manner.

22. The airbag module as claimed in claim 17, wherein the airbag package is arranged at the side, adjacent to the gas generator, such that the gas generator and the airbag package are arranged adjacent to one another along the cover of the airbag module.

23. The airbag module as claimed in claim 17, wherein at least one side wall of the airbag module extends transversely to the cover of the airbag module.

24. The airbag module as claimed in claim 23, wherein the at least one side wall may be opened during inflation of the airbag, so that the airbag may be deployed through an aperture which is opened up when opening the side wall.

25. The airbag module as claimed in claim 23, wherein the side wall is articulated pivotably on the airbag module by a film hinge.

26. The airbag module as claimed in claim 17, wherein the at least one airbag layer is arranged in front of the outer surface of the cover as a component of the airbag module, the airbag layer forming a component of the airbag sleeve and being permanently connected to the airbag sleeve.

* * * * *